March 11, 1969
F. E. TURNER
3,432,188
PLASTIC PIPE SADDLE
Filed Feb. 1, 1967
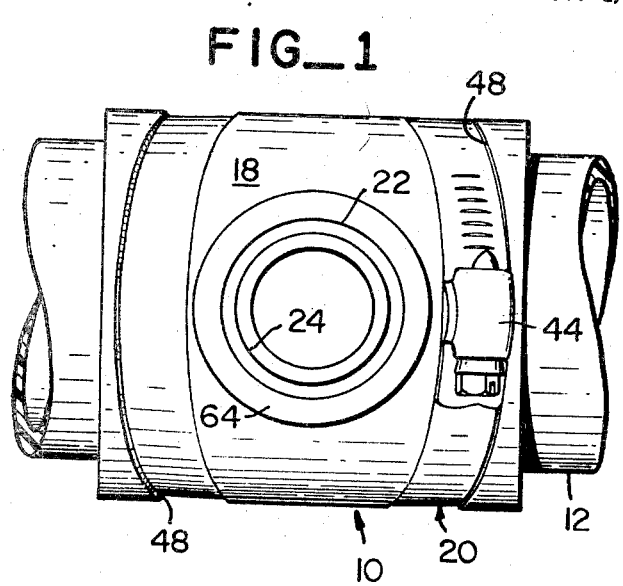
FIG_1
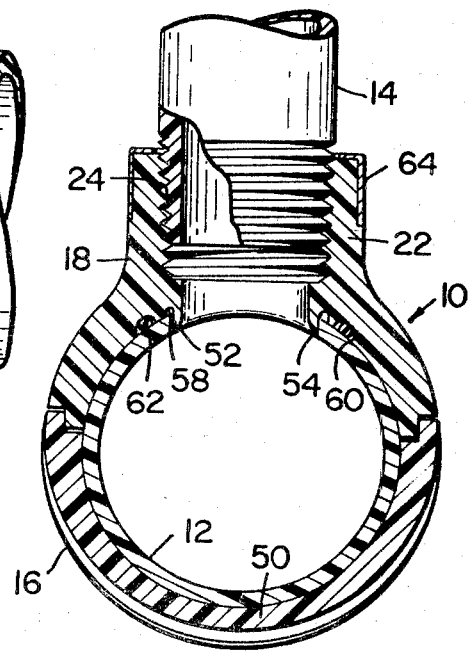
FIG_4
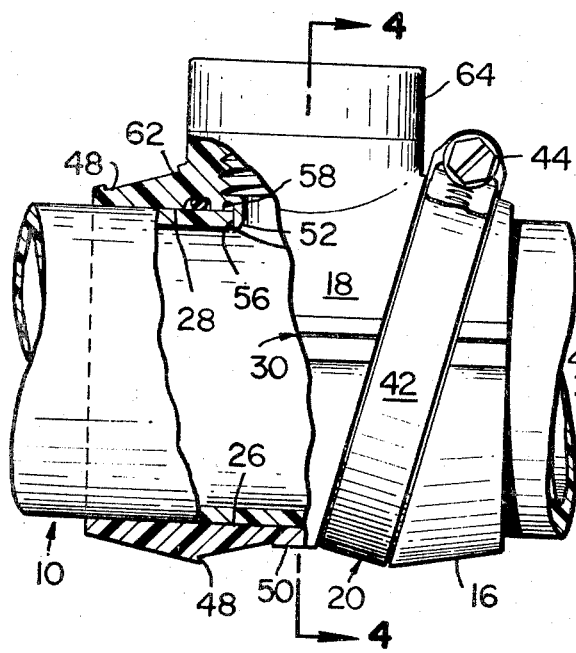
FIG_2
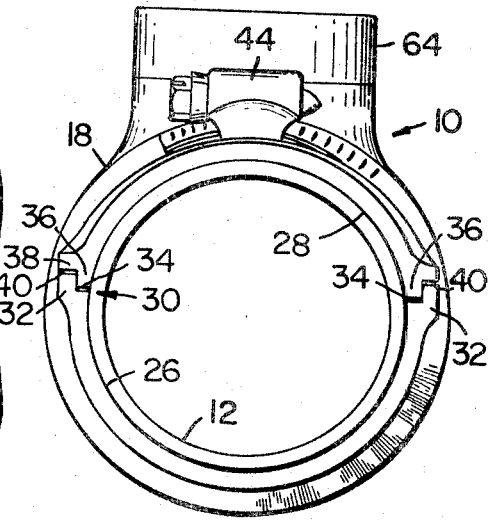
FIG_3
INVENTOR.
FRANK E. TURNER
BY
Owen, Wickersham & Erickson
ATTORNEYS

# United States Patent Office 3,432,188
Patented Mar. 11, 1969

3,432,188
PLASTIC PIPE SADDLE
Frank E. Turner, San Mateo, Calif., assignor to Smith-Blair Inc., San Francisco, Calif., a corporation of California
Filed Feb. 1, 1967, Ser. No. 613,202
U.S. Cl. 285—197
Int. Cl. F16l 41/00, 33/00, 49/00, 31/00
2 Claims

ABSTRACT OF THE DISCLOSURE

A pipe saddle is provided comprised of a pair of curved plastic body members that fit around a pipe and are held firmly together by a pair of retaining bands, one of the body members having a boss with a threaded bore and an inner flexible collar that positions and maintains the saddle properly on the pipe and increases hydraulic efficiency at the conduit junction.

---

This invention relates to an improved tapping saddle or sleeve for fluid conduit systems.

In the construction of fluid conduit systems it has long been the practice to utilize tapping saddles to attach a lateral line to a main. Recently, the advantages of lighter, noncorrosive pipe materials have been realized with the development of nonmetallic pipe. However, with the use of such pipe in fluid pressure systems the need arose for a saddle capable of overcoming certain problems. For example, unlike metal, many nonmetallic plastic pipe materials, although basically strong, have a tendency to cold flow, creep and deform under the long term loading characteristic of constant pressure fluid systems. Also, thermal expansion of plastic materials in conduit systems is greater than that of metals.

A general object of the present invention is to provide a tapping saddle that can be made of plastic material and thereby take advantage of its fundamental properties of resistance to corrosion and light weight, and yet a saddle that will overcome the aforesaid problems of such materials. More particularly, an object is to provide a saddle for use on a fluid conduit under pressure that will provide adequate strength and will maintain its sealing for a long service life.

Another object of the present invention is to provide a saddle particularly adapted for nonmetallic pipe which will grip the pipe so that the frictional locking forces are well distributed along the saddle and are fully adequate to hold the saddle in position and provide adequate sealing without cracking or distorting the pipe. This feature also allows my saddle to easily maintain its installed position with adequate gripping power despite variations in pipe size from its nominal size and despite any expansion or contraction of the pipe due to internal pressure or temperature fluctuations.

Another object of the present invention is to provide a pipe saddle that is unusually strong and durable even though it is molded from a relatively light nonmetallic material.

Still another object of the present invention is to provide a pipe saddle that is hydraulically efficient in that the entrance of the saddle bore from inside the pipe is free from obstructions or any sharp edges that would tend to increase the resistance to the flow of fluid at this junction.

Another object of the present invention is to provide a pipe saddle made from semirigid plastic material that is self-positioning within a bore made in the pipe wall and yet which is sufficiently flexible to accommodate minor variations or distortions in the shape of the bore which may occur when the pipe is drilled.

The aforesaid objects are accomplished by a combination of integrally molded saddle body members which fit together at expandable joints and are held tightly around a pipe by a pair of straps or clamps that can be taken up to produce and hold the desired hoop tension or clamping strength. These saddle members overlap at longitudinal joints on opposite sides of the pipe so that despite a variance in the pipe size and expansion or contraction thereof, they will remain securely around it. One of the saddle members has a projecting boss portion with a threaded bore and extending inwardly from the inner surface of this saddle member around the bore is a positioning collar.

Another object of the present invention is to provide a pipe saddle that is particularly easy to install with a minimum of unskilled labor.

Still another object of the present invention is to provide a pipe saddle for fluid conduit systems that is well adapted for ease and economy of manufacture.

Further objects, advantages and features of the present invention will become fully apparent from the following detailed description of one embodiment thereof taken with the accompanying drawings, wherein:

FIG. 1 is a top view of a saddle embodying the principles of the present invention shown installed on a pipe with one retaining band removed;

FIG. 2 is a view in side elevation of the pipe saddle shown in FIG. 1, with a portion of the saddle broken away;

FIG. 3 is an end view of the saddle shown in FIGS. 1 and 2;

FIG. 4 is an end view in section taken along line 4—4 of FIG. 2.

Referring in particular to FIGS. 1 and 2 of the drawings, a pipe saddle 10 embodying the principles of the present invention is shown assembled and installed on a main fluid conduit 12 so that a lateral pipe (designated by the numeral 14 in FIG. 4) can be connected at a right angle thereto. The saddle is particularly adaptable for use on nonmetallic pipe and is itself preferably made from a suitable plastic material which is solid, durable and semirigid depending on the thickness of a given section. Such plastic materials as polypropylene, for example, may be used to make my saddle and enable it to function in accordance with the present invention.

In broad terms, the saddle 10 comprises a pair of mating body members 16 and 18 which are both curved in essentially a semicylindrical shape to fit snugly around the main pipe 12 that has been tapped or drilled. These curved body members are held together on the main pipe by a pair of adjustable retaining bands 20 which extend around the body members in a manner that enables the latter to grip the pipe with unusual strength when the clamps are tightened. The upper body member 18 has a boss 22 with a threaded bore 24 whose axis is perpendicular to the axis of the main pipe 12, and when the saddle is installed, the lateral pipe 14 is threaded into the aforesaid boss to complete the conduit junction.

As shown in FIG. 3, the lower and upper body members of my saddle have semicylindrical inner surfaces 26 and 28, respectively, each having a curvature that substantially matches that of the outer main pipe surface. These body members fit together around the pipe at longitudinal joints 30 that extend on opposite sides of the main pipe. Each joint is formed by a longitudinal flange 32 on each edge of the lower body member 16 that is offset radially outwardly from its curved inner surface 26 and thereby forms a longitudinal recess 34. The longitudinal end edges of the upper body member 18 form an inner flange portion 36 that fits within the aforesaid recess 34 of the lower member 16. A radially extending longitudinal rib 38 spaced from the flange portion 36 forms a recess 40 which also serves as a stop for receiving the flange 32 of the lower body member 16. Thus, when the two saddle members are properly in position around the pipe the longitudinal flanges 32 and 36 overlap and slide together at each joint 30. The depth of both recesses 34 and 40 preferably exceeds the length of the flanges 32 and 36 so that a substantial amount of sliding adjustment can take place thereby allowing some variation in pipe size to be accommodated with the same size of saddle.

The retaining bands or clamps 20 are preferably of the locking worm gear type, each comprised of a flexible metal band portion 42 and a rotatable worm gear member 44 meshed with the band and supported in a housing thereon. These bands 20 are seated and retained in external grooves 48 formed in the outside surfaces of both saddle body members when they are molded and located on opposite sides of the boss 22. As shown in FIG. 2, it is preferred that the bands or clamps 20 be oriented at an angle to the longitudinal axis of the main pipe on which the saddle is installed and toward the centerline of the boss. When so oriented they not only hold the saddle body members together on the main pipe but they also exert pressure effectively to the upper body member so that adequate sealing around the boss is assured. The grooves 48 for the retaining bands are in effect cylindrical surfaces whose axes are located at an angle to the main pipe, and the surfaces of both members are contoured to accommodate these cylindrical surfaces. As shown in FIG. 2, the bottom body member 16 has a wall thickness that first increases at its opposite ends and then decreases at the band grooves 48 to a center portion 50 of uniform thickness. The upper body member similarly increases in thickness from its opposite ends to accommodate the band grooves and also to form a strong and rigid supporting base for the boss 22.

An important feature of my invention is the ability of the saddle to position and retain itself easily and effectively within a hole that has been drilled in the main pipe to receive the saddle. Often, due to the flexibility and resultant distortion of the main pipe of nonmetallic material during the drilling of the hole, it will become irregular in shape. To position the saddle in such irregular shaped holes and for other reasons an annular lip or collar 52 is provided around the inner end of the saddle bore 24, as shown in FIGS. 2 and 4. In cross section this lip is relatively thin so that it is somewhat flexible. It extends radially inwardly from the inner surface 28 of the upper saddle member a constant amount and thus into the hole 54 in the pipe that has been previously drilled. Its edge contour follows the curvature of the pipe wall so that its inside corner 56, which is rounded to a smooth curved surface around the entire lip edge, is flush with the inside pipe surface. Thus, the lip provides a smooth entrance to the lateral pipe 14, and a minimum of hydraulic resistance is encountered at the saddle junction. In order to increase the flexibility of the positioning lip an annular recess 58 is provided adjacent to it. Spaced radially from this latter recess is another slightly larger annular groove 60 within which is retained a sealing ring 62. When the saddle is installed on a pipe the sealing ring 62 engages the pipe surface around the drilled hole to prevent any leakage.

To strengthen the boss at its outer end and prevent any enlargement thereof due to high pressure, I prefer to provide an annular band of metal 64 at the end of the boss. This band is fully circular and force fitted to the boss in a recessed area so that it is flush therewith.

The saddle 10 may be used with particular convenience and efficiency for installing a plurality of laterals in a main pipe of plastic material. Instead of cutting the main pipe to lengths and undertaking the laborious job of installing T fittings to provide lateral junctions, the main pipe 12 can be first completely laid out in the desired manner. Holes 54 can then be drilled and a saddle 10 installed wherever a lateral is required. Once the hole is drilled, the upper saddle member 18 is easily positioned in it properly by means of the annular lip 52. The lower saddle member 16 is then placed on the pipe and brought into engagement with the upper saddle member 18 at the longitudinal joints 30. The flexible retaining clamps 20 can now be installed in their respective cylindrical seats 48 and are taken up to the proper tightness. As the tension of these bands is increased, the sealing ring 62 of the upper saddle member 18 is pressed hard against the pipe around the drilled opening therein to seal the joint.

From the foregoing, it should be apparent that the present invention provides a saddle that is unusually easy to install, and when installed provides a durable, well sealed fluid conduit junction. Moreover, the unique configuration of its cooperating elements are particularly adapted to low cost, high volume production.

To those skilled in the art to which this invention relates, many changes in construction and widely differing embodiments and applications of the invention will suggest themselves. The disclosures and the description herein are purely illustrative and are not intended to be in any sense liimting.

I claim:

1. A pipe saddle comprising, in combination:
   upper and lower body members of a resilient polymeric material, each having an inner semicylindrical surface, a boss member extending outwardly from said upper body member and having a threaded bore, both said body members having longitudinal edge means which slidably engage to form joints when said body members are positioned around a pipe;
   retaining bands extending around both said body members on opposite sides of said boss;
   sealing means around the entrance to said bore;
   and an integral, positioning collar coaxial with said bore and spaced radially inwardly from said sealing means and extending axially inwardly beyond the semicylindrical inner surface of said upper body member;
   said collar extending inwardly from said inner curved surface of said upper body a uniform amount thereby defining an edge which substantially conforms in curvature to the inner surface of the pipe the axial extent inwardly of the collar being such that it does not extend appreciably into the flow within the pipe when installed thereon, and being rounded near its radial inner edge to form a smoothly convergent entrance from said main pipe to the boss bore to thereby present a minimum of hydraulic resistance;
   a thin web integrally joining said collar with said upper body member and acting to space said collar radially therefrom thereby defining an annular recess adjacent said collar to afford an additional degree of flexibility thereto sufficient to accommodate irregularities in the shape of a hole drilled in a main pipe for said saddle, and to provide a fluid pressure seal against the edge defining said hole.

2. A pipe saddle comprising, in combination:
   a pair of body members of a resilient plastic material, each having an inner semicylindrical surface whereby to define a cylindrical surface when assembled in adjoined relation, a boss extending outwardly from one of said members, and a groove on the exterior of each of said members a portion of which lies adjacent the axial ends thereof defining a pair of continuous seats, each formed as a surface of revolution, with a diameter of each said surface of revolution disposed at an acute angle with the axis of said cylindrical surface and with the seats being closest together at a zone opposite the boss, said seats being adapted to receive a clamp therein to retain the saddle assembled on a pipe.

References Cited

UNITED STATES PATENTS

| | | | |
|---|---|---|---|
| 951,704 | 3/1910 | Schmidt | 285—110 X |
| 1,634,153 | 6/1927 | Long | 285—252 X |
| 1,971,438 | 8/1934 | Yoder | 285—252 X |
| 2,512,009 | 6/1950 | Bober | 285—197 |
| 2,690,193 | 9/1954 | Smith | 138—99 |
| 3,307,435 | 3/1967 | Floren | 77—42 |

FOREIGN PATENTS

| | | |
|---|---|---|
| 1,063,429 | 8/1959 | Germany. |
| 1,167,131 | 4/1964 | Germany. |
| 845,533 | 8/1960 | Great Britain. |

CARL W. TOMLIN, *Primary Examiner.*

W. L. SHEDD, *Assistant Examiner.*

U.S. Cl. X.R.

138—99; 77—42; 285—420, 373, 253